United States Patent
Liberty et al.

(10) Patent No.: US 10,129,197 B2
(45) Date of Patent: Nov. 13, 2018

(54) COMPUTERIZED SYSTEM AND METHOD FOR MODIFYING A MESSAGE TO APPLY SECURITY FEATURES TO THE MESSAGE'S CONTENT

(71) Applicant: OATH INC., New York, NY (US)

(72) Inventors: Edo Liberty, Haifa (IL); Yoelle Maarek, Haifa (IL)

(73) Assignee: OATH INC., New York, NY (US)

( * ) Notice: Subject to any disclaimer, the term of this patent is extended or adjusted under 35 U.S.C. 154(b) by 214 days.

(21) Appl. No.: 14/985,844

(22) Filed: Dec. 31, 2015

(65) Prior Publication Data

US 2017/0195274 A1    Jul. 6, 2017

(51) Int. Cl.
*H04L 12/58* (2006.01)
*G06F 21/62* (2013.01)
*H04L 29/06* (2006.01)

(52) U.S. Cl.
CPC .......... *H04L 51/22* (2013.01); *G06F 21/6245* (2013.01); *H04L 51/12* (2013.01); *H04L 63/0428* (2013.01)

(58) Field of Classification Search
CPC ..... G06F 21/6245; H04L 51/12; H04L 51/22; H04L 63/0428
USPC ................................................. 709/206–207
See application file for complete search history.

(56) References Cited

U.S. PATENT DOCUMENTS

| | | | | |
|---|---|---|---|---|
| 5,085,469 A | * | 2/1992 | Castro | B41M 3/14 283/100 |
| 5,727,163 A | * | 3/1998 | Bezos | G06Q 20/385 235/379 |
| 7,908,554 B1 | * | 3/2011 | Blattner | G06Q 10/107 715/706 |
| 9,128,591 B1 | * | 9/2015 | Arora | G06F 17/30876 |
| 2003/0234814 A1 | * | 12/2003 | Salminen | H04M 1/72552 715/758 |
| 2004/0169581 A1 | * | 9/2004 | Petrovic | G10L 19/018 340/5.2 |
| 2005/0060643 A1 | * | 3/2005 | Glass | G06F 17/241 715/205 |
| 2006/0158460 A1 | * | 7/2006 | Uh | G06F 21/84 345/619 |

(Continued)

*Primary Examiner* — Alina A Boutah
(74) *Attorney, Agent, or Firm* — James J. DeCarlo; Greenberg Traurig, LLP

(57) ABSTRACT

Disclosed are systems and methods for improving interactions with and between computers in content providing, generating and/or hosting systems supported by or configured with personal computing devices, servers and/or platforms. The systems interact to identify and retrieve data within or across platforms, which can be used to improve the security and quality of data used in processing interactions between or among processors in such systems. The disclosed systems and methods provide added security features and functionality to messaging platforms. Message content within communicated or to be communicated messages can be subject to such security functionality through the identification of selected message portions having an identifier applied therewith that not only hides the selected message portions from being viewed within a message interface, but also modifies the message thereby rendering the selected message portion as unreadable and/or inaccessible by a user or computing device without the required security credentials.

12 Claims, 10 Drawing Sheets

(56) References Cited

U.S. PATENT DOCUMENTS

| | | | |
|---|---|---|---|
| 2007/0277120 A1* | 11/2007 | Wilson | G06F 1/1626 715/808 |
| 2008/0005284 A1* | 1/2008 | Ungar | H04L 12/1859 709/219 |
| 2009/0006565 A1* | 1/2009 | Velusamy | G06F 17/211 709/206 |
| 2009/0214034 A1* | 8/2009 | Mehrotra | G06Q 10/107 380/255 |
| 2012/0046099 A1* | 2/2012 | Mraovic | A63F 3/0421 463/30 |
| 2013/0036374 A1* | 2/2013 | Melamed | G06F 3/04812 715/760 |
| 2013/0194301 A1* | 8/2013 | Robbins | G06F 21/60 345/629 |
| 2014/0012916 A1* | 1/2014 | van Ham | H04L 65/403 709/204 |
| 2014/0223572 A1* | 8/2014 | Roh | G06F 17/2235 726/26 |
| 2014/0304828 A1* | 10/2014 | Hollier | G06F 21/606 726/26 |
| 2015/0007351 A1* | 1/2015 | Janajri | H04L 63/04 726/30 |
| 2015/0227761 A1* | 8/2015 | Cohen | H04L 51/16 726/30 |
| 2015/0254454 A1* | 9/2015 | Clemente | H04L 51/12 726/26 |
| 2015/0286790 A1* | 10/2015 | Ahmad | G06F 17/2705 705/2 |
| 2015/0302218 A1* | 10/2015 | Fielder | G06F 19/322 713/193 |
| 2016/0014066 A1* | 1/2016 | Goto | H04L 51/34 709/206 |
| 2016/0191472 A1* | 6/2016 | Ghafourifar | H04L 63/0428 713/167 |
| 2017/0098103 A1* | 4/2017 | Clemente | G06F 21/84 |

* cited by examiner

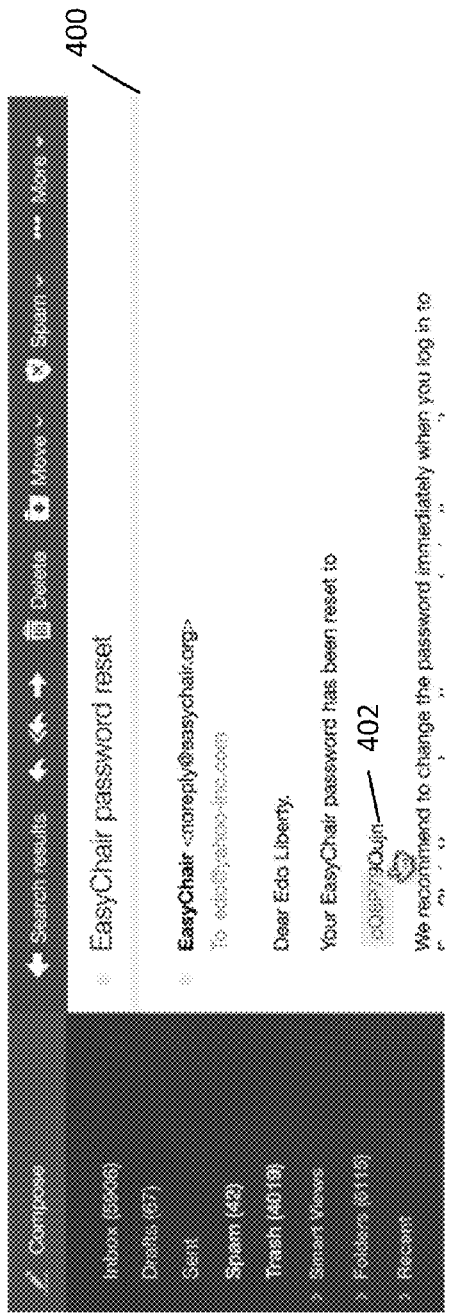
FIG. 4A
FIG. 4B

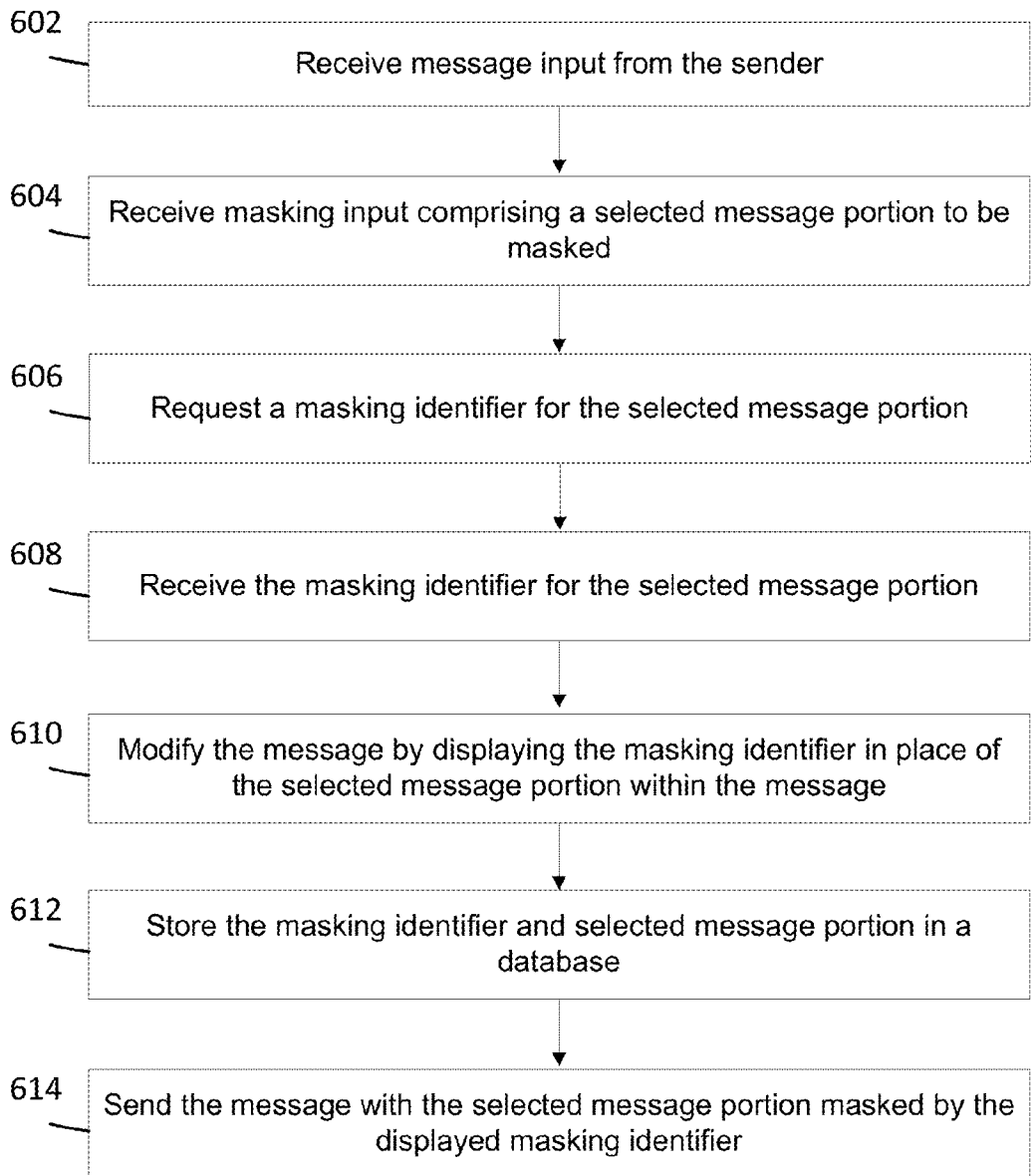

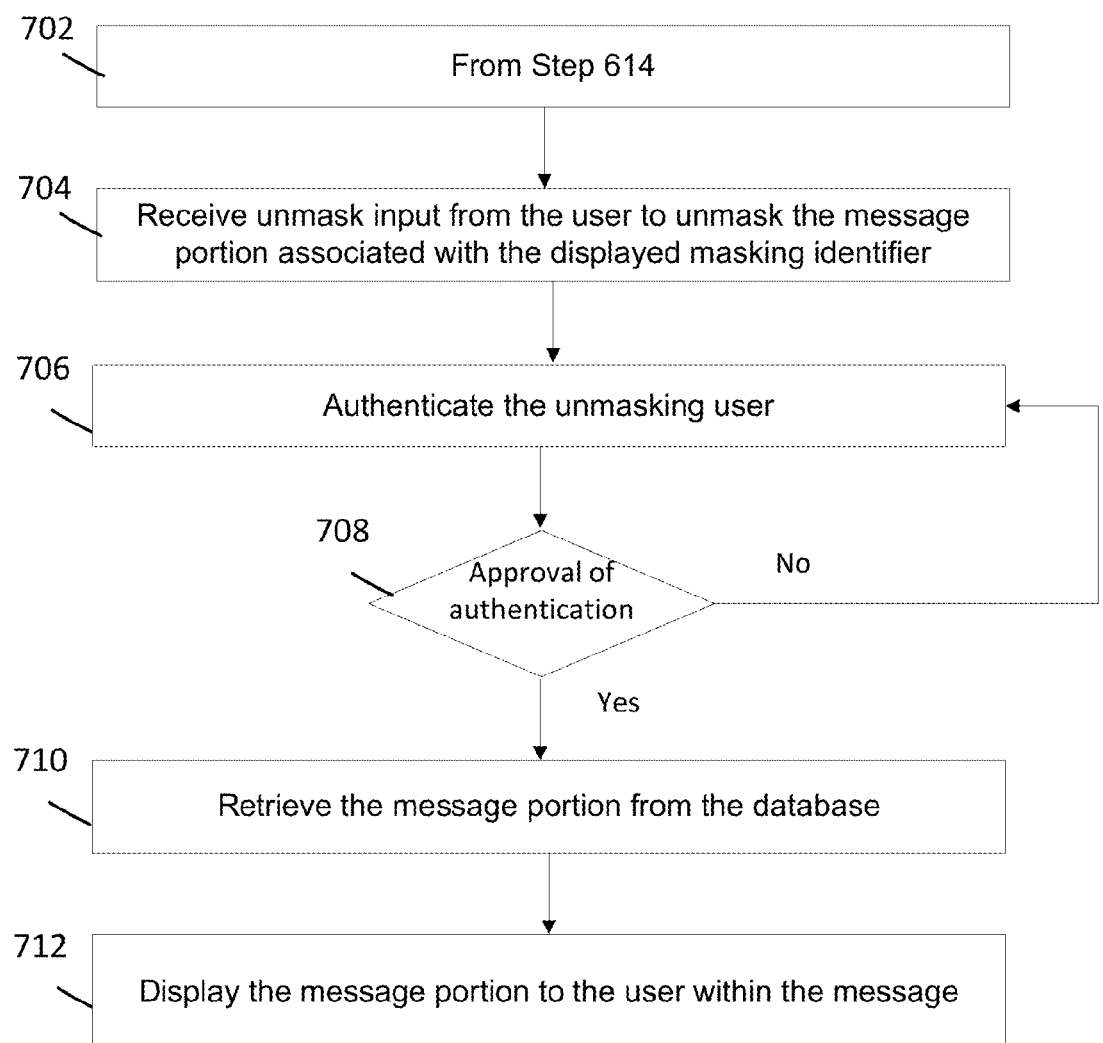

COMPUTERIZED SYSTEM AND METHOD FOR MODIFYING A MESSAGE TO APPLY SECURITY FEATURES TO THE MESSAGE'S CONTENT

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of content providing, generating, and/or hosting systems and/or platforms by modifying the capabilities and providing non-native functionality to such systems and platforms by enabling advanced security functionality to be applied to communicated electronic content via computerized masking and unmasking techniques that secure the privacy of such content.

SUMMARY

The present disclosure provides computerized systems and methods that enable users to protect their personal and/or private information from unwanted viewing and accessing parties. As discussed herein, according to some embodiments, the disclosed systems and methods provide a novel, computerized security feature(s) to messaging platforms, services and systems that protects user data from unintended exposure to third parties.

According to some embodiments, messages communicated to and from users can be subject to the additional security features disclosed herein. In some embodiments, a sending user can draft a message addressed to a recipient, and securely identify specific elements of the message content that is to be protected. In some embodiments, a recipient user can receive a message from a sending user, and securely identify specific elements of the message content that is to be protected.

As discussed in more detail below, the protection that is applied to such messages is referred to as "masking." Masking a message involves applying a security feature to identified message content for purposes of hiding, removing, or in some embodiments encrypting the identified content. Thus, only the intended viewing user of such identified content is able to view or otherwise interact with such content.

In some embodiments, as discussed in more detail below, masking (or locking or protecting) message content involves the masking user (whether the recipient or sending user) effectuating an input on the message content that is desired to be protected (for secure communication and/or storage). In some embodiments, such input can involve, but is not limited to, highlighting the content, entering a command, selecting (via a double-click) and the like. Once the content is identified, the masking user can provide information for renaming the masked content and a password associated therewith, which therein takes the place of the identified content in the message. In order to "unmask" (or access or view) the protected content, the unmasking user must enter the password (or applied credential), which effectuates the display of the protected content.

As discussed in more detail below, the masking and/or unmasking of message content (or a message as a whole) involves an "authentication" process that ensures that only the user(s) granting, or being granted access rights to the protected content is able to view and/or interact with such content.

It will be recognized from the disclosure herein that embodiments of the instant disclosure provide improvements to a number of technology areas, for example those related to systems and processes that handle or process content communications, such as but not limited to, email or other types of known or to be known messaging platforms, local and/or web-based applications, electronic social networking platforms, and the like. The disclosed systems and methods effectuates novel, increased security and user privacy within all ways users communicate, receive and store information. As evidenced from the discussion herein, this reduces the risk that a user's private or personal information will fall victim to unnecessary or unwanted exposure. Therefore, users will be provided a novel, secure online experience which will enable users to communicate more freely and more securely.

In accordance with some embodiments, methods are disclosed for securely communicating and/or storing messages over the internet.

In accordance with one or more embodiments, a non-transitory computer-readable storage medium is provided, the non-transitory computer-readable storage medium tangibly storing thereon, or having tangibly encoded thereon, computer readable and executable instructions that when executed cause at least one processor to perform a method for securely communicating and/or storing messages over the internet.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIGS. 4A-4D illustrate non-limiting example embodiments in accordance with some embodiments of the present disclosure;

FIG. 6 is a flowchart illustrating steps performed in accordance with some embodiments of the present disclosure;

FIG. 7 is a flowchart illustrating steps performed in accordance with some embodiments of the present disclosure;

DESCRIPTION OF EMBODIMENTS

Figure 1:
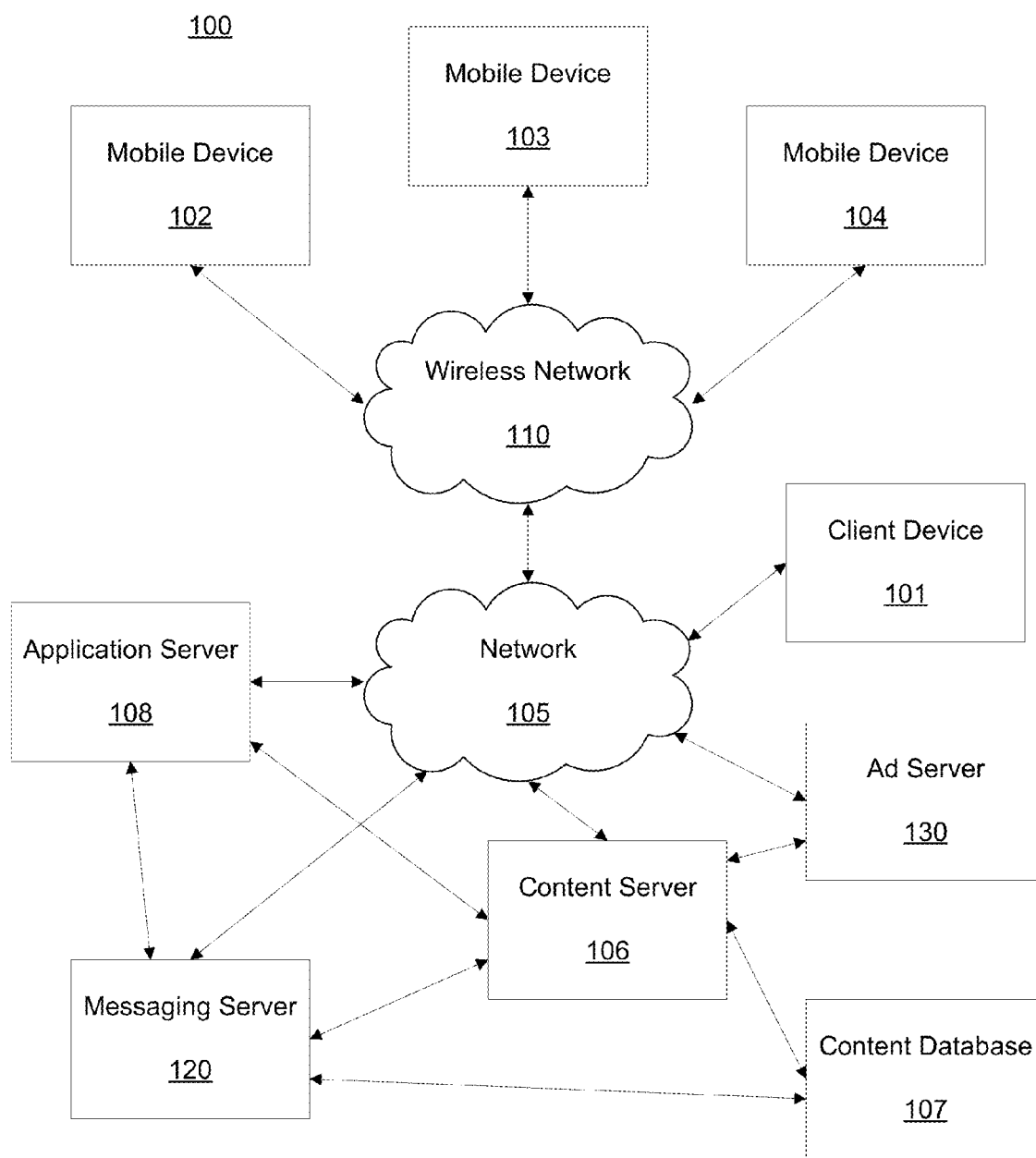
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or sender or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high-resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo!® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, editing, searching, playing, streaming or displaying various forms of content, including locally stored or uploaded messages. The foregoing is provided to illustrate that claimed subject matter is intended to include a wide range of possible features or capabilities.

The principles described herein may be embodied in many different forms. Electronic mail ("email") usage has become omnipresent in everyday use, and while providing a way for communicating more efficiently with each other, electronic mail typically includes personal or private information that is being communicated to, from and between individuals, businesses, organizations, and other entities. For example, such information in messages can include passwords, health records, social security information, and the like. The existence of such information in a user's inbox makes the user more vulnerable to unwanted exposure to and/or malicious exploitation by a third party. Indeed, even deleting messages is insufficient to prevent the information from unnecessary or unwanted exposure. Thus, in today's world, mail users have critical concerns that their private information may be unexpectedly exposed.

The present disclosure remedies the need in the art for added security of user's personal and private information by providing the disclosed systems and methods that provide additional, novel security features to online message communications. Conventional systems typically employ security protocols to messages as a whole, and typically only at the platform level (e.g., the point of access for a messaging platform). The disclosed systems and methods provide improved security features down to the particular content items within messages.

While the discussion herein will focus on protected and/or secured portions messages—i.e., identified message content, it should not be construed as limiting, as the disclosed systems and methods can be applied to messages as a whole, and not only particular portions of such messages. Additionally, while the discussion herein will focus on message content (e.g., information or data comprised within a message), it should not be construed as limiting, as any type of content can be subject to the disclosed security implementations discussed herein, such as, but not limited to, whole or portions of, audio, video, text, and/or any other known or to be known multi-media existing within the digital world.

The disclosed systems and methods, according to some embodiments, involve protecting and/or securing identified (or selected) portions or items of message content within a message. The protection/security applied to such message content can occur during drafting of the message, prior to transmittal of the message, during transmission, after receipt of the message by the message recipient, and/or some combination thereof. For purposes of this disclosure, the applied protection/security to the message content will be referred to as "masking", and the removal and/or unlocking of such security will referred to as "unmasking."

In some embodiments, "masking" can involve modifying a selected portion of a message, whereby the selected portion can be replaced by an identifier. In some embodiments, the identifier can be a tag, label, a pointer, added content or media item, and/or any other type of data or metadata that can provide an identity of the masked content and identify the masked content as protected. The identifier may be defined by a user, the system as a whole, an application (e.g., messaging application), messaging provider or platform, service provider or platform, and the like, or some combination thereof. When the identifier is applied, the masking user can apply a security credential that enables the unlocking of the masked content. Such credential can include, but is not limited to, a password, token, key, PIN or other type of known or to be known type of information that can act as a credential for confirming a user's identity (e.g., biometrics).

As discussed in more detail below, the identifier "takes the place" of the selected message content. In some embodiments, the message content is extracted and/or removed entirely from the message, and the identifier replaces the message content within the format, position or structure of the message. In some embodiments, the identifier may overlay or "hide" the message content so that the message content is unable to be viewed, read or accessed by a user or message platform without having the authenticating key or password for unlocking the identifier. In some embodiments, masking results in the selected portion of the message content being rendered invisible or obfuscated while the identifier is applied to the selected message content.

According to some embodiments, replacing, locking and/or hiding the identified/selected message content with the identifier (referred to as the masking identifier) can involve applying encryption to the selected portion of the message. In some embodiments, the type of encryption algorithm or scheme applied to the message may be selected and/or defined by the masking user, the system as a whole, an application (e.g., messaging application), messaging provider or platform, service provider or platform, and the like, or some combination thereof. According to some embodiments, any known or to be known negotiated encryption key or a pre-defined encryption key may be utilized by disclosed systems and methods without departing from the scope of the instant disclosure.

As evidenced from the discussion herein, masking allows the user and the messaging system and/or platform or service to agree on a privacy protocol that is applied to the message (and message content). As discussed in more detail below, in some embodiments, the applied privacy protocol may prevent the receiving user's device, the server processing the message or the application or service processing the message (or any third party) from processing, reading, viewing or accessing the masked content. In some embodiments, the applied privacy protocol may prevent the masked content from being identified in a search for the particular content that is masked; in some embodiments, only the identifier may be searchable.

As discussed in more detail below, when message content is "masked" with an identifier, information related to the identified content and the applied identifier can be stored in database. As discussed in more detail below, the database can comprise a linked dataset where the masked content is stored in association with the applied identifier. In some embodiments, as mentioned above, the identifier can comprise a pointer, where the stored identifier points to the location in the database of the associated content. In some embodiments, the database can be constructed as a lookup table (LUT) that effectuates the identification of counterpart information upon receiving a searchable item with the table. As discussed in more detail below, this enables the quick retrieval, and appropriate authentication or denial of users requesting access to the masked content.

"Unmasking", as will be discussed in more detail below, results in the masked content (e.g., protected and hidden or obfuscated content of the message) being rendered displayable to the user within the message. In line with the above discussion related to encrypting the message content upon masking it, in order to view the masked content (i.e., unmask the content), the disclosed systems and methods can employ any known or to be known decryption techniques or algorithms. As discussed in more detail below, decryption involves entering the defined password, key, token or command defined during masking. Upon approval of the entered credentials, the hidden or obfuscated content of the message may be accessed by retrieving the hidden content from the database based on a search of the database involving the masking identifier (or information associated with the identifier.

According to some embodiments, the disclosed systems and methods provides a specialized front-end User Interface (UI) for enabling the masking/unmasking security features discussed herein, as well as a matching server side back-end mechanisms that allow users to secure messages as a whole or particular message content of drafted, sent, received or otherwise communicated messages.

By way of a non-limiting example, user Bob is drafting a message to send to his wife that includes his social security (SS) number. Typically Bob would have to rely on the security schemes or features that are only available on his and his wife's messaging platforms to protect such information. In fact, the only barrier between Bob and potential unwanted parties (e.g., identity thieves or hackers) is the mail platform's security features (e.g., login information for users). Through the disclosed systems and methods, Bob is now able to rest easy because in addition to his and his wife's mail platform's security features, Bob's SS number can be subject to the additional security features discussed herein. According to some embodiments, Bob can "mask" the SS number in the message before sending to his wife. As discussed above, and in more detail below, Bob can identify the SS number within the message draft and provide an identifier and password. Therefore, upon the message being sent to his wife, she (and any other viewing party, whether the server and/or hacker) cannot view the content as she can only see the identifier that takes the place of the SS number in the message. Upon clicking on the identifier and entering the password set by Bob, his wife can then view his SS number. In some embodiments, since Bob set the identifier with respect to his wife as the dedicated recipient, even if another user gains access to the password, since they are not his wife, they are unable to access the content. Therefore, in some embodiments, in order to access a locked (or masked) content item within a message, the user must have the password and have the correct identity.

As discussed in more detail below at least in relation to FIG. 9, according to some embodiments, information associated with or derived from a message and/or particular message content, whether protected or not, as discussed herein, can be used for monetization purposes and targeted advertising when providing, delivering or enabling access to the messages. Providing targeted advertising to users associated with such discovered content can lead to an increased click-through rate (CTR) of such ads and/or an increase in the advertiser's return on investment (ROI) for serving such content provided by third parties (e.g., digital advertisement content provided by an advertiser, where the advertiser can be a third party advertiser, or an entity directly associated with or hosting the systems and methods discussed herein).

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108, messaging server 120 and advertising ("ad") server 130.

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web-based messages, and the like. The browser application may be configured to receive and display messages which include graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like of the message. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, and the like that may route the signal packet in accordance with a target address and availability of a network path to the target address.

According to some embodiments, the present disclosure may also be utilized within or accessible to an electronic social networking site. A social network refers generally to an electronic network of individuals, such as, but not limited to, acquaintances, friends, family, colleagues, or co-workers, that are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site or service, such as a messaging site/service (e.g., Yahoo!® Mail), an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, messaging services, search services, email services, web services, social networking services, news services, third-party services, audio services, video services, instant messaging (IM) services, SMS services, MMS services, FTP services, voice over IP (VOIP) services, or the like. Such services, for example a messaging application and/or message platform, can be provided via the application server 108, whereby a user is able to utilize such service upon the user being authenticated, verified or identified by the service. Examples of message content may include images, text, audio, video, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, gender, occupation, and the like) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, authentication servers, search servers, email servers, social networking services servers, SMS servers, IM servers, MMS servers, and exchange servers, via the network 105 using their various devices 101-104. In some embodiments, applications such as messaging applications (e.g., Yahoo!® Mail, Yahoo! Messenger®, Twitter®, Gmail®, and the like), or social network applications without messaging (e.g., Twitter®, Instagram®, SnapChat®, Facebook®, and the like) are both configured with the added functionality to mask and unmask certain portions of the content. For example, certain posts can be masked in Tumblr® and sent (reblogged) to other users for them to unmask. Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120 and/or 130.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
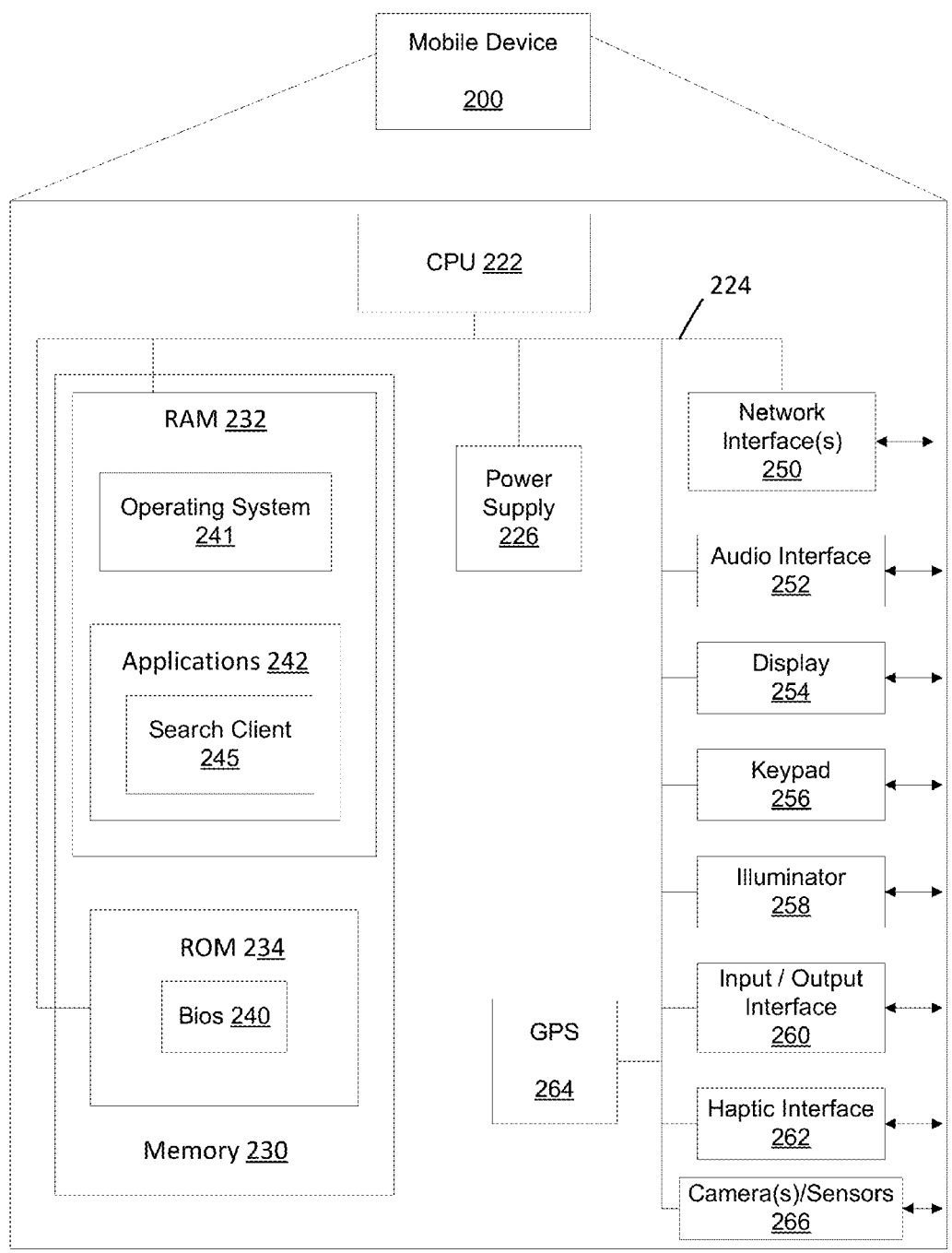
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending messages. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, tri-angulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process messages, and enable telecommunication with a server and/or another user of another client device. Other examples of application programs or "apps" in some embodiments include browsers, calendars, contact managers, task managers, transcoders, message management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving advertisements, IMs, emails, and other types of known messages, or the like.

Having described the components of the general architecture employed within the disclosed systems and methods, the components' general operation with respect to the disclosed systems and methods will now be described below.

Figure 3:
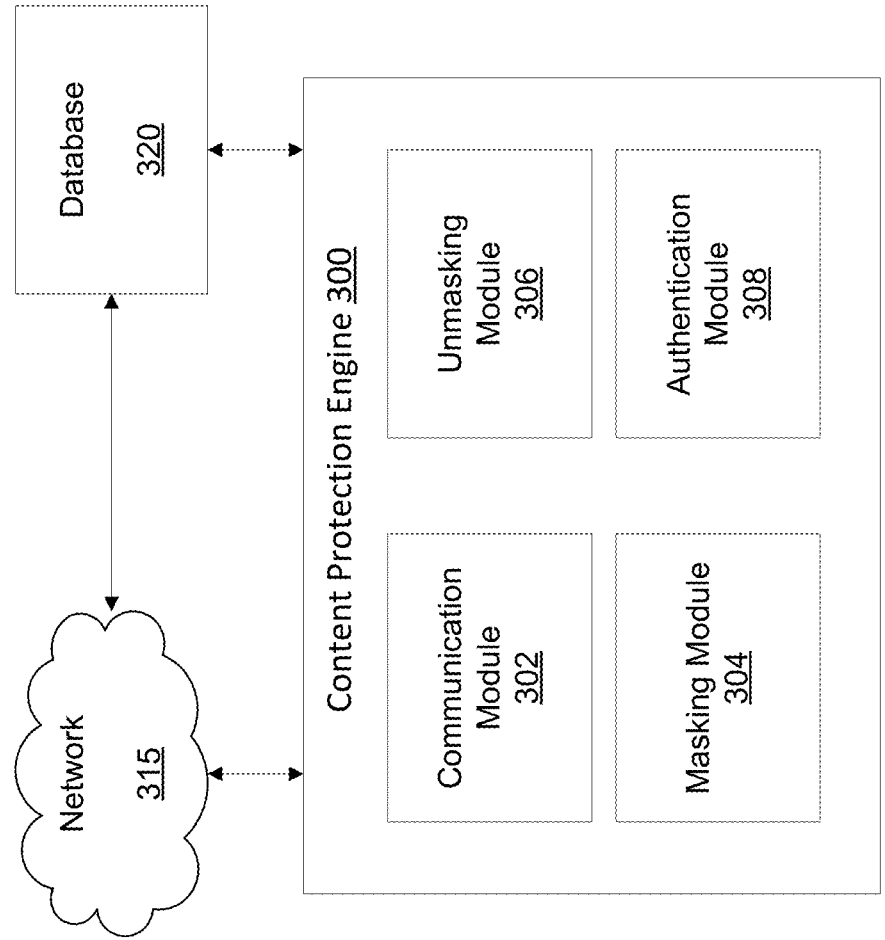
FIG. 3 is a schematic block diagram illustrating components of an exemplary system in accordance with embodiments of the present disclosure.

FIG. 3 is a block diagram illustrating the components for performing the systems and methods discussed herein. FIG. 3 includes a content protection engine 300, network 315 and database 320. The content protection engine 300 can be a special purpose machine or processor and could be hosted by an application server, content server, social networking server, web server, search server, content provider, email service provider, ad server, user's computing device, and the like, or any combination thereof.

According to some embodiments, content protection engine 300 can be embodied as a stand-alone application that executes on a user device. In some embodiments, the content protection engine 300 can function as an application installed on the user's device, and in some embodiments, such application can be a web-based application accessed by the user device over a network. In some embodiments, the content protection engine 300 can be installed as an augmenting script, program or application to another message application (e.g., Yahoo!® Mail, Yahoo!® Messenger, Twitter®, Gmail®, and the like).

The database 320 can be any type of database or memory, and can be associated with a content server on a network (e.g., content server 106, messaging server 120 or application server 108 from FIG. 1) or a user's device (e.g., device 101-104 or device 200 from FIGS. 1-2). Database 320 comprises a dataset of data and metadata associated with local and/or network information related to users, services, applications, content (e.g., messages), and the like. Such information can be stored and indexed in the database 320 independently and/or as a linked or associated dataset. As discussed above, it should be understood that the data (and metadata) in the database 320 can be any type of information and type, whether known or to be known, without departing from the scope of the present disclosure.

According to some embodiments, database 320 can store data for users, i.e., user data. According to some embodiments, the stored user data can include, but is not limited to, information associated with a user's profile, user interests, user behavioral information, user attributes, user preferences or settings, user demographic information, user location information (i.e., past and present location(s) of the user, and future locations of the user (derived from a calendar or schedule of the user—e.g., planned activities), user biographic information, and the like, or some combination thereof. In some embodiments, the user data can also include, for purposes rendering and/or displaying messages, user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a message, a user, content, a device, an application, a service provider, a content provider, whether known or to be known, without departing from the scope of the present disclosure.

According to some embodiments, database 320 can comprise information associated with content providers, such as, but not limited to, messaging applications (e.g., Yahoo!® Mail, Yahoo! Messenger®, Twitter®, Gmail®, and the like), or social network sites or providers (e.g., Twitter®, Instagram®, SnapChat®, Facebook®, and the like). In some embodiments, database 320 can comprise data and metadata associated with message content from one and/or an assortment of message hosting sites.

In some embodiments, the information stored in database 320 can be represented as an n-dimensional vector (or feature vector) for each message, where the information associated with the message corresponds to a node(s) on the vector. Additionally, the message information in database 320 for each message can comprise, but is not limited to, text, image or multimedia content of the message, a title or comment(s) associated with the message, tags, descriptions, recency of message's transmittal or reception, upload and/or share(s), and the like. Such factors can be derived from information provided by the user, a service provider (e.g., Yahoo!®, Gmail®), by the content/service providers providing message content (e.g., Yahoo!® Messenger, Windows Live Messenger®, and the like), or by other third party services (e.g., Twitter®, Facebook®, Instagram®, and the like), or some combination thereof. In some embodiments, such additional factors can also be translated as nodes on the n-dimensional vector for a respective message.

As such, database 320 can store and index message content in database 320 as linked set of message data and metadata, where the data and metadata relationship can be stored as the n-dimensional vector discussed above. Such storage can be realized through any known or to be known vector or array storage, including but not limited to, a hash tree, queue, stack, VList, or any other type of known or to be known dynamic memory allocation technique or technology. While the discussion herein will focus on vector analysis of message information, as discussed above, the message information can be analyzed, stored and indexed according to any known or to be known computational analysis technique or algorithm, such as, but not limited to, cluster analysis, data mining, Bayesian network analysis, Hidden Markov models, artificial neural network analysis, logical model and/or tree analysis, and the like.

Database 320 can be a single database or a lookup table (LUT) housing information associated with such providers, and in some embodiments, database 320 can be configured as a linked set of data stores that provides such information, as each data store in the set is associated with and/or unique to a specific service provider.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the content protection engine 300, and the database of stored resources 320. Indeed, as illustrated in FIG. 3, the content protection engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as content protection engine 300, and includes communication module 302, masking module 304, unmasking module 306 and authentication module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below with reference to FIGS. 4A-8.

Turing to the discussion of the disclosed systems and methods for masking and unmasking message content, the instant disclosure will first discuss example embodiments of the disclosed systems and methods for which accompanying flowcharts will be based, but not-limited to.

Figure 4C:
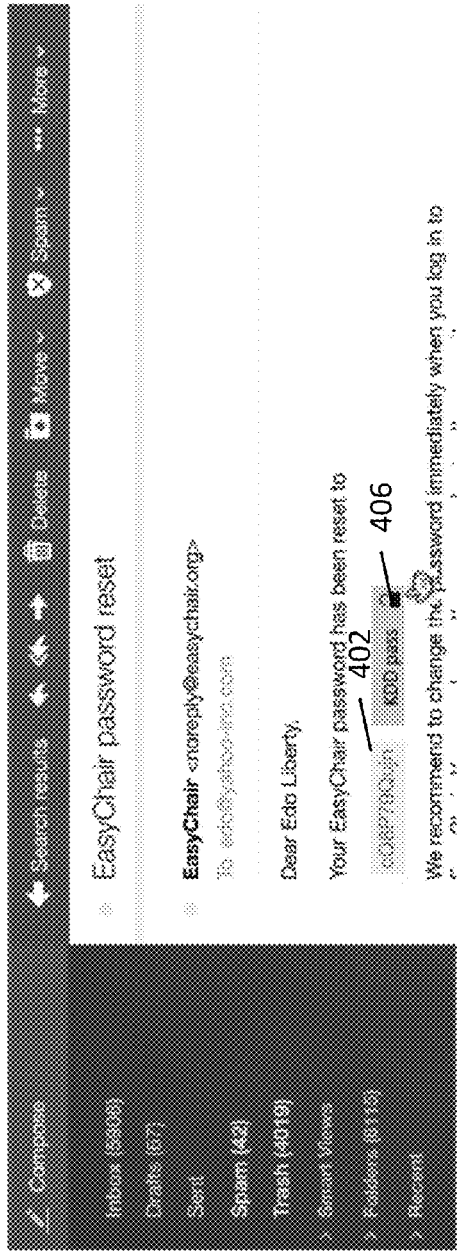

FIG. 4A-4D illustrate example embodiments of an email sender referred to as "EasyChair™" drafting an email message 400 addressed to a recipient Edo from his email account's mailbox (e.g., Yahoo!® Mail account). The message 400 includes private information related to a temporary reset password: "cQ8P79Qujn"—content item 402. FIG. 4A shows that EasyChair™ selects the private information 402 and marks it as the information to be masked.

When the private information 402 has been selected, an information object (or dialog box) 410 appears within the display of the message 400 (either as part of the message UI or as an overlaying object), as shown in FIG. 4B. The information object 410 comprises a text box 408 and a lock icon 406. The text box is configured to receive input of a masking identifier 404. The lock icon 406 is configured to receive input designating that the masking identifier is set and the mask can be applied, as discussed below.

As illustrated in FIGS. 4B-4C, EasyChair™ enters "KDD pass" as the masking identifier 404 within text box 408, and clicks on the lock icon 406 which sets the masking identifier 404 as the identifier that is to hide, replace or otherwise obfuscate the private information 402.

According to some embodiments, upon receiving the instruction of locking, the message is modified to replace the private information 402 in the message with the masking identifier "KDD pass" 404. Modifying the message can include, for example, but is not limited to, replacing the private information 402 with the masking identifier "KDD pass" 404. Therefore, the private information 402 is not visible to EasyChair™, nor will it be for Edo when he receives the message until he unlocks (or unmasks the content).

In some embodiments, EasyChair™ can set up authentication instructions for verifying the identity of the user(s) that can unlock and view the private information 402. For example, EasyChair™ may set a password that would need to be entered to unlock the protected, private information 402. Unmasking the private information 402 involves following the authentication instructions set up by EasyChair™ when masking the password 402. In some embodiments, authentication for accessing the private information 402 may be set by the message platform either during drafting of the message 400, during communication of the message 400 (upon receipt by the messaging server) or upon delivery to the recipient. In some embodiments, authentication can be of any form, such as requesting the user to enter the password, requesting to enter a PIN number, asking a security question, verifying a code through a text message or phone call (e.g., two-step verification), confirming biometrics of a user, and the like, or combination thereof.

Figure 4D:
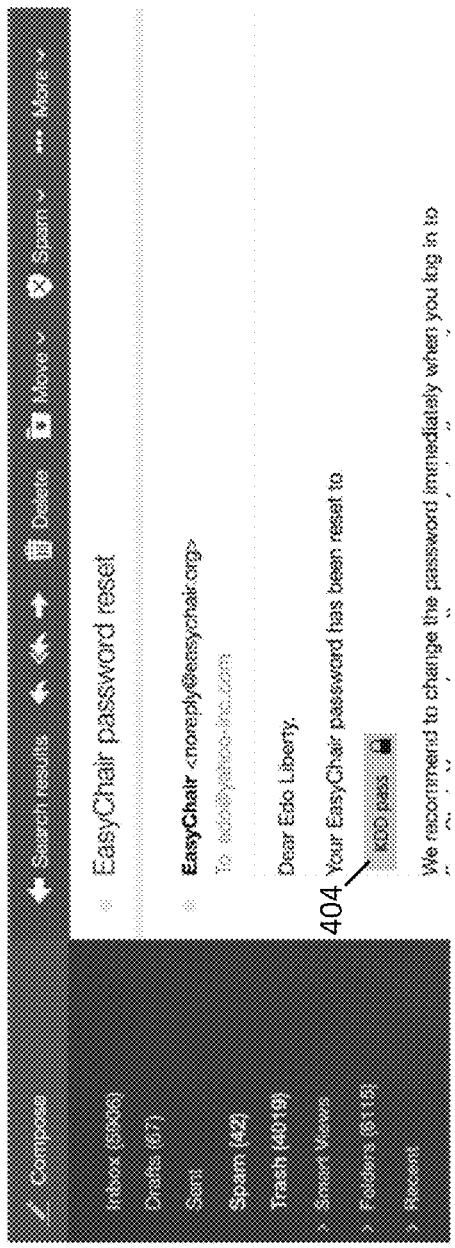

Thus, as illustrated in FIG. 4D, the message 400 has been modified to display the masking identifier 404 in the place of the private information 402. As discussed above, and in more detail below, this replacement of the information 402 with the identifier 404 can involve, inter alia, extracting the information 402 from the message 400, encrypting the message information associated with private information 402, or simply overlaying the identifier 404 over the information 402.

When user EasyChair™ finishes drafting the message 400 and masking the information 402, he can then send the message according to normal communication protocol that is in accordance with the message platform or service providing the messaging capabilities EasyChair™ is using to draft the message 400. As discussed above, however, the masked (or hidden or locked content) can be configured to be not viewable, not searchable, and not accessible by any user or device while it is locked (or the mask is applied—when the identifier is present).

Figure 5A:
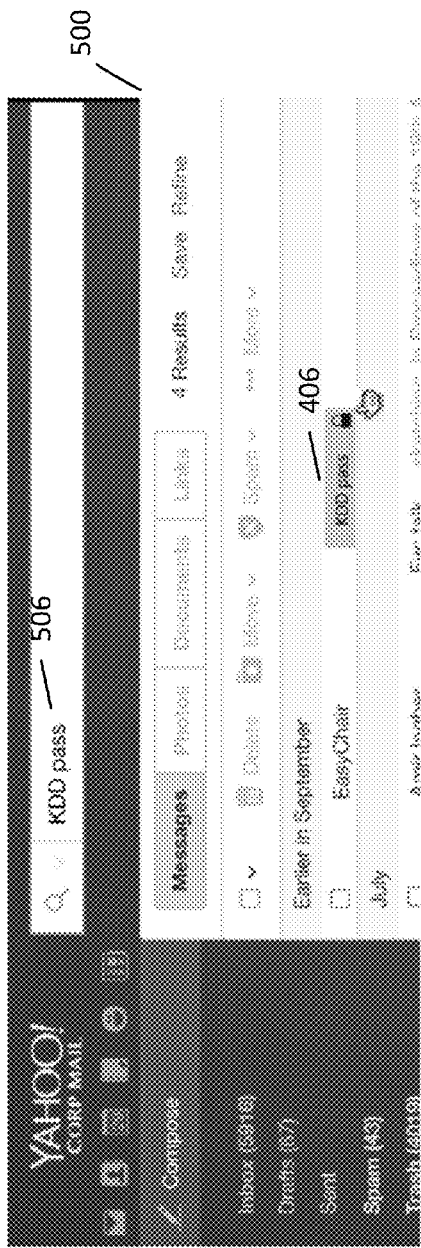
FIGS. 5A-5B illustrate non-limiting example embodiments in accordance with some embodiments of the present disclosure.
Figure 5B:
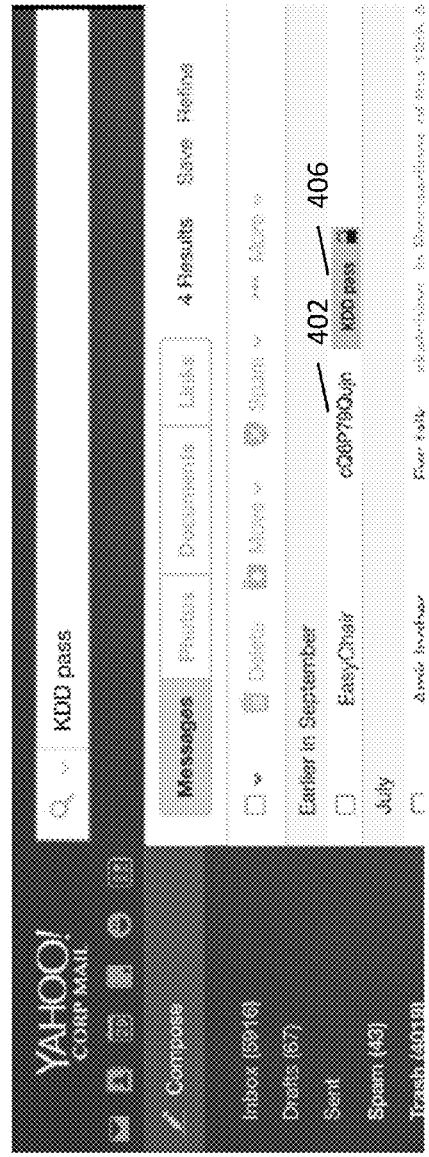

Continuing with the above example, which evidences a non-limiting example embodiment of functionality provided by the disclosed systems and methods, FIGS. 5A and 5B illustrate the recipient Edo receiving message 400 within his inbox 500 (e.g., Edo's inbox provided by Yahoo!® Mail). The email 400 Edo receives comprises masked content (private information 402) represented/replaced by the masking identifier ("KDD pass" 404).

As with most messaging platforms, user Edo is able to search for messages based on, for example, text comprised within messages. However, since the message content 404 is masked it is unsearchable because it is not readable, viewable or accessible by any user, system, device, bot, script, plug-in or engine while it is locked. Therefore, user Edo can search for the masking identifier ("KDD pass" 404) by entering a character string associated with the masking identifier 404 in a search window 506 his mailbox 500—for example, by entering "KDD pass", as illustrated in FIG. 5A. When the email comprising the masking identifier ("KDD pass" 404) is located, Edo can unmask the protected content (private information 402) by entering the authentication credentials set by EasyChair™ (or the system) after clicking on the masking identifier 406—e.g., entering the password EasyChair™ set when applying the masking identifier 404, as discussed above. As illustrated in FIG. 5B, after the credentials are entered, the masking identifier 406 is removed (or "lifted) from the message 400, and the private information 404 is revealed.

Having described some non-limiting example embodiments of the improved security features and capabilities the disclosed systems and methods provide to messaging systems and platforms, as illustrated in FIGS. 4A-5B, the instant disclosure will turn to discussing the processes being employed for masking and unmasking the message content within communicated messages. FIGS. 6-7 and respective Processes 600-700 will be discussed with reference to the above examples for purposes of clarity and ease of understanding the disclosed subject matter; however, they should not be construed as being limited solely to such embodiments, as one of ordinary skill in the art would understand the disclosed subject matter's applicability to apply to additional fields of use, such as, for example, within a social networking context where user's posts or shares (e.g., likes) are masked from other user's in the social networking space.

Turning to FIG. 6, Process 600 details steps performed in accordance with some embodiments where a sender (Easy-Chair™) is drafting a message addressed to a recipient in a messages system, and portions of the message content can be masked and unmasked. Steps 602 and 614 of Process 600 are performed by the communication module 302 of the content protection engine 300, Steps 604-610 are performed by the masking module, and Step 612 is performed by the authentication module 308.

Process 600 begins with Step 602 where message input is received from a sender. For example, as discussed above in relation to FIG. 4A, the sender EasyChair™ is drafting an email addressed to recipient Edo. The message input may comprise content that includes, but is not limited to, text, content, images, audio, video, or any other type of multimedia content capable of being included in an email message, or some combination thereof.

Upon receiving the message input, Step 604 involves receiving masking input from the message sender. The masking input comprises information indicating at least a portion of the message that is to be masked (or locked or protected). The masking input can include, but is not limited to any known or to be known type of input that identifies the portion of the message. Such input, for example, can include, a selection, click, double-click, entered command, voice command, iris-detected command, and the like, that can identify, select and/or highlight a message portion. For example, as in FIG. 4A, EasyChair™ selects the private information 402 by dragging his mouse cursor over the text of the password "cQ8P79Qujn" thereby highlighting it in the draft email 400.

According to some embodiments, upon receiving the masking input in Step 604, a request for a masking identifier for the selected message portion is displayed. Step 606, as discussed above in relation to FIGS. 4B-4C. As discussed above, the request for a masking identifier input can involve, but is not limited to, displaying an information object or dialog box that requests the sender to enter the masking identifier. As above, the masking identifier can include, but is not limited to, a string of characters, integers, variables or symbols. In some embodiments, the masking identifier may be selected from a predetermined or randomized listing or menu of masking identifiers.

Process 600 then proceeds to Step 608 where the masking identifier is received. In some embodiments, the masking identifier is received via a selection by the sending user, as discussed above. For example, the masking identifier can be a name defined by the sender of the message to identify and replace the selected message content. It should be understood that the user could enter an irrelevant name such as "cat" or even a random string of characters such that the masking identifier cannot be easily determined by third party, nor enable a third party to predict what is being hidden. In the example of FIGS. 4A-4D, EasyChair™ uses "KDD pass" as the masking identifier to replace the private information 402 in the draft email message 400. As discussed above, the masking identifier can be any arrangement of characters, numbers, variables, symbols and the like.

In some embodiments, the masking identifier may be automatically and/or randomly set according to instructions or preferences set by the user, system or email platform or service. In such embodiments, Steps 606 and 608 are automatically performed and a masking identifier is applied to the message.

Process 600 then proceeds to Step 610 where the message is automatically modified to replace the selected message portion with the masking identifier. As discussed above, in some embodiments, modifying the message can include, but is not limited to, replacing the selected portion of the message with the masking identifier so that the selected portion is not visible or accessible in the email, whereby the masking identifier is displayed instead of the selected message portion, as illustrated in FIGS. 4A-4D as discussed above. In some embodiments, such modification can include altering the format or structure of the message such that the data/metadata associated with the masking identifier replaces the data/metadata of the selected message portion within the message's format/structure. Additionally, in some embodiments, such modification can include encrypting the message, as discussed above.

By performing Step 610 to replace the selected message portion with the masking identifier, at Step 612, the masking identifier, the associated masked message portion and optionally the authentication instructions can be stored in the database 320, as discussed above.

According to some embodiments, Steps 604-612 can be performed after Step 602 is completed and/or at the same time when Step 602 is performed. For example, the sender EasyChair™ may select and mask the password 402 before the drafting of the email is completed, because EasyChair™ may be interrupted and may want to come back and edit the email later. In this way, EasyChair™ may leave the unfinished draft email without worrying about exposure of the masked private information. EasyChair™ may also mask the password 402 after the email is completed and the recipient is identified. Thus, the masking process of Steps 604-612 can be performed at any time prior to communication of the message to the recipient. In some embodiments, Steps 604-612 can be performed even after transmittal of the message to the recipient, such as in instances where the recipient has yet to download, open or otherwise view the message content. In some embodiments, masking can also occur after the message has been opened, where the only caveat is that the message portion(s) has been unprotected for the time prior to masking. In such embodiments, the masking instructions can be communicated as instruction messages from the sender's mailbox to the recipient's mailbox, and applied by the server hosting the messaging platform or the messaging application running on the recipient's device.

In Step 614, the modified message is sent to the recipient over the network. For example, as discussed above in FIGS. 4A-4D, sender EasyChair™ sends the email to recipient Edo after completing the masking of the content item 402 in the email 400.

Upon communicating the modified message to the recipient, the modified message can be displayed in a mailbox of the recipient with the masked portions of the message content being rendered not visible to the recipient (while the mask is applied). The recipient is able to view the selected portion via authentication, as discussed in relation to FIG. 7.

Process 700 of FIG. 7 details steps performed in accordance with some embodiments where the recipient of a message comprising masked content unmasks (or unlocks) the masked portions of the message. Steps 704 and 710 of Process 700 are performed by the unmasking module 306, Steps 706-708 are performed by the authentication module 308 and Steps 702 and 712 are performed by the communication module 302.

Upon receiving the modified message from the sender at Step 614 (Step 702 of Process 700), Step 704 involves receiving an unmasking input from the recipient. The unmasking input comprises a request (or information indicating the recipient's desire) to unmask the hidden message content. As discussed above, the unmasking input is provided by the user in relation to the masking identifier that is displayed within the message. In some embodiments, the unmasking input can be a similar input type related to the masking input, as discussed above.

Upon receipt of the unmasking input, process 700 proceeds to Step 706 in order to perform authentication of the unmasking user in accordance with the sending user's authentication instructions that are associated with the masking identifier. As discussed above, the authentication instructions can be, for example, previously set up and stored in the database by the sender who masked the selected message portion. In the examples of FIGS. 4A-4D, recipient Edo can select the identifier "KDD pass" from the email received from sender EasyChair™, whereby interface object 410 can be displayed which enables Edo to enter the password for unlocking the hidden content.

In Step 708, a determination is made whether the password entered by the recipient user is correct. If it is not, the process proceeds back to Step 706 requesting the user to enter the credentials again. In some embodiments, should the credentials entered be incorrect a number of times satisfying a security threshold, then the message may be locked (for a predetermined period of time), or deleted, and/or the masking user may be notified.

If the credentials entered in Step 706 are determined to be correct in Step 708, then the process proceeds to Step 710. In Step 710, the database is accessed in order to retrieve the stored information related to the masking identifier and associated selected message portion. As discussed above, the masking identifier applied to the selected message portion are stored in association with one another in the database for fast access and retrieval. In some embodiments, the masking identifier may comprise a pointer indicating the location within the database 320 where the information associated with the selected message portion is located. For example, as FIGS. 4A-4D, the private information 402 is located within database 320 and retrieved based on a search involving the masking identifier "KDD pass" 404.

After the requested portion of the message content is retrieved, the information can be displayed to the recipient within the message. Step 712. Such display can involve communicating the message content to the recipient for display within the message, or simply removing the overlaying identifier that was applied to hide (and encrypt) the message content, as discussed above.

According to some embodiments, the masking and unmasking of message content can occur by a message recipient as well. Thus, upon a user receiving a message in his/her inbox, the masking steps/process discussed above in relation to Process 600 can be performed by the recipient user. And, upon the user desiring to unmask such content, the recipient user can perform the steps outlined in Process 700.

Thus, it should be understood that any message, whether a draft message, saved message, deleted message (in the "trash folder" of a mailbox), sent message, forwarded message, and the like, can be subject to the masking and unmasking protocol discussed above in relation to, inter alia, FIGS. 4A-7 by any user that has access to the message. In some embodiments, only those users that are intended recipients or senders of a message may perform the masking and unmasking processes discussed in FIGS. 6-7.

Figure 8:
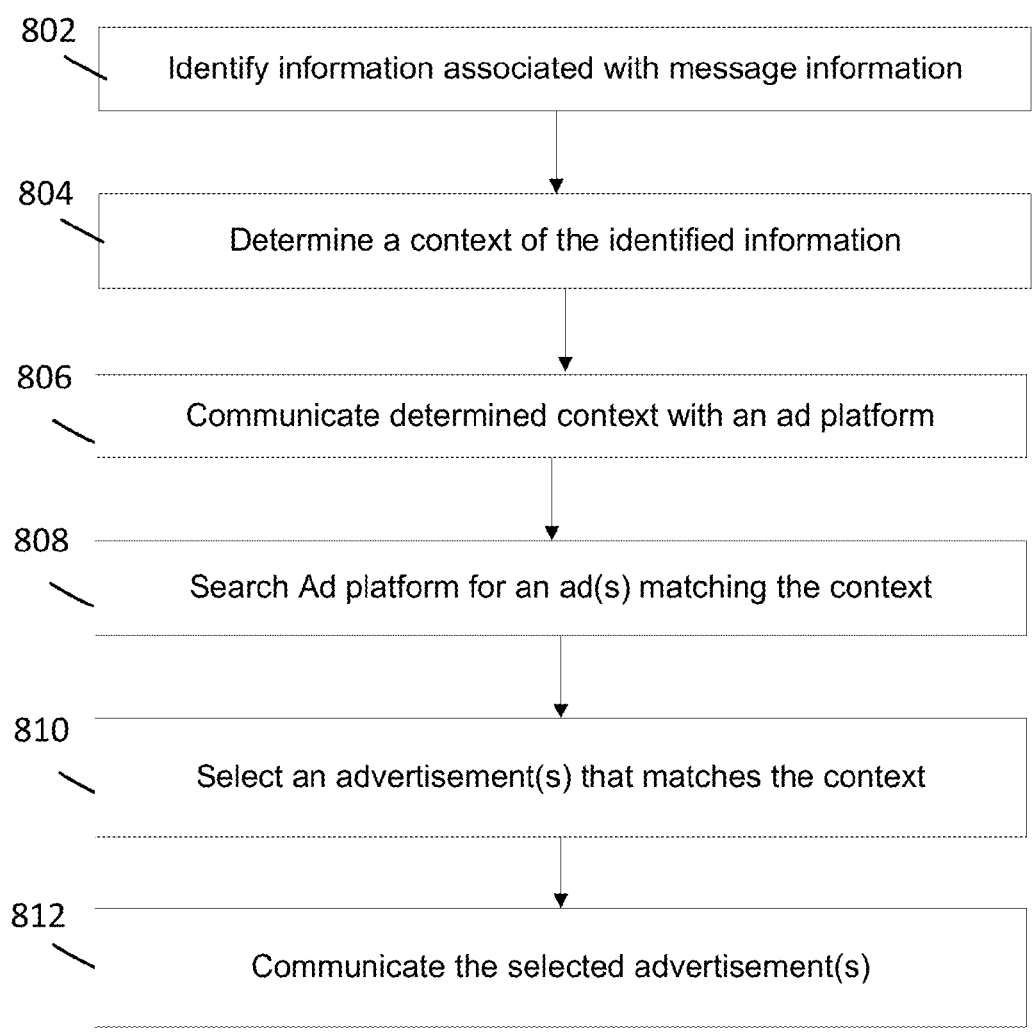
FIG. 8 is a flowchart illustrating steps performed in accordance with some embodiments of the present disclosure.

FIG. 8 is a work flow example 800 for serving relevant digital content associated with advertisements (e.g., advertisement content) based on the information associated with communicated messages, as discussed above. Such information, referred to as "message information" for reference purposes only, can include, but is not limited to, the content in a message (whether protected or unprotected), identify of the sending or receiving user, the identity and/or type of the message application being used to communication and/or mask such messages, and the like, and/or some combination thereof.

As discussed herein, reference to an "advertisement" should be understood to include, but not be limited to, digital content that provides information provided by another user, service, third party, entity, and the like. Such digital ad content can include any type of media renderable by a computing device, including, but not limited to, video, text, audio, images, and/or any other type of known or to be known multi-media. In some embodiments, the digital ad content can be formatted as hyperlinked multi-media content that provides deep-linking features and/or capabilities.

By way of a non-limiting example, work flow 800 includes user John sending a message to a third party supplier for the purchase of a bicycle, where the message includes his credit card number. John as masked his credit card number; however, the message can be analyzed to determine that the message's context is related to the purchase of a bicycle, therefore, John can receive promotional information in the form of digital advertisements displayed on his device or sent to his inbox related to bicycle accessories. In some embodiments, once John unmasks the content (which reveals that the masked content is a credit card number), digital ads may be sent to John related to promotional credit cards that have low interest rates.

In Step 802, message information associated with a communicated message is identified. For purposes of this disclosure, Process 800 will refer to single communicated (e.g., sent/received) message as the basis for serving an advertisement(s); however, it should not be construed as limiting, as any number of messages can form the basis for serving ads without departing from the scope of the instant disclosure.

In Step 804, a context is determined based on the identified message information. This context forms a basis for serving advertisements related to the message information. In some embodiments, the context can be determined by determining a category which the message information of Step 802 represents. For example, the category can be related to the content type of the content in the message. In some embodiments, the identification of the context from Step 804 can occur before, during and/or after the message is communicated and/or before or after the content is masked and/or unmasked, or some combination thereof.

In Step 806, the context (e.g., content/context data) is communicated (or shared) with an advertisement platform comprising an advertisement server 130 and ad database. Upon receipt of the context, the advertisement server 130 performs a search for a relevant advertisement within the associated ad database. The search for an advertisement is based at least on the identified context.

In Step 808, the advertisement server 130 searches the ad database for an advertisement(s) that matches the identified context. In Step 910, an advertisement is selected (or retrieved) based on the results of Step 808. In some embodiments, the selected advertisement can be modified to conform to attributes of the page, message or method upon which the advertisement will be displayed, and/or to the application and/or device for which it will be displayed. In some embodiments, the selected advertisement is shared or communicated via the application the user is utilizing to communicate messages (e.g., Yahoo! Mail). Step 912. In some embodiments, the selected advertisement is sent directly to each user's computing device. In some embodiments, the selected advertisement is displayed in conjunction with the communicated message(s) and/or protected content.

Figure 9:
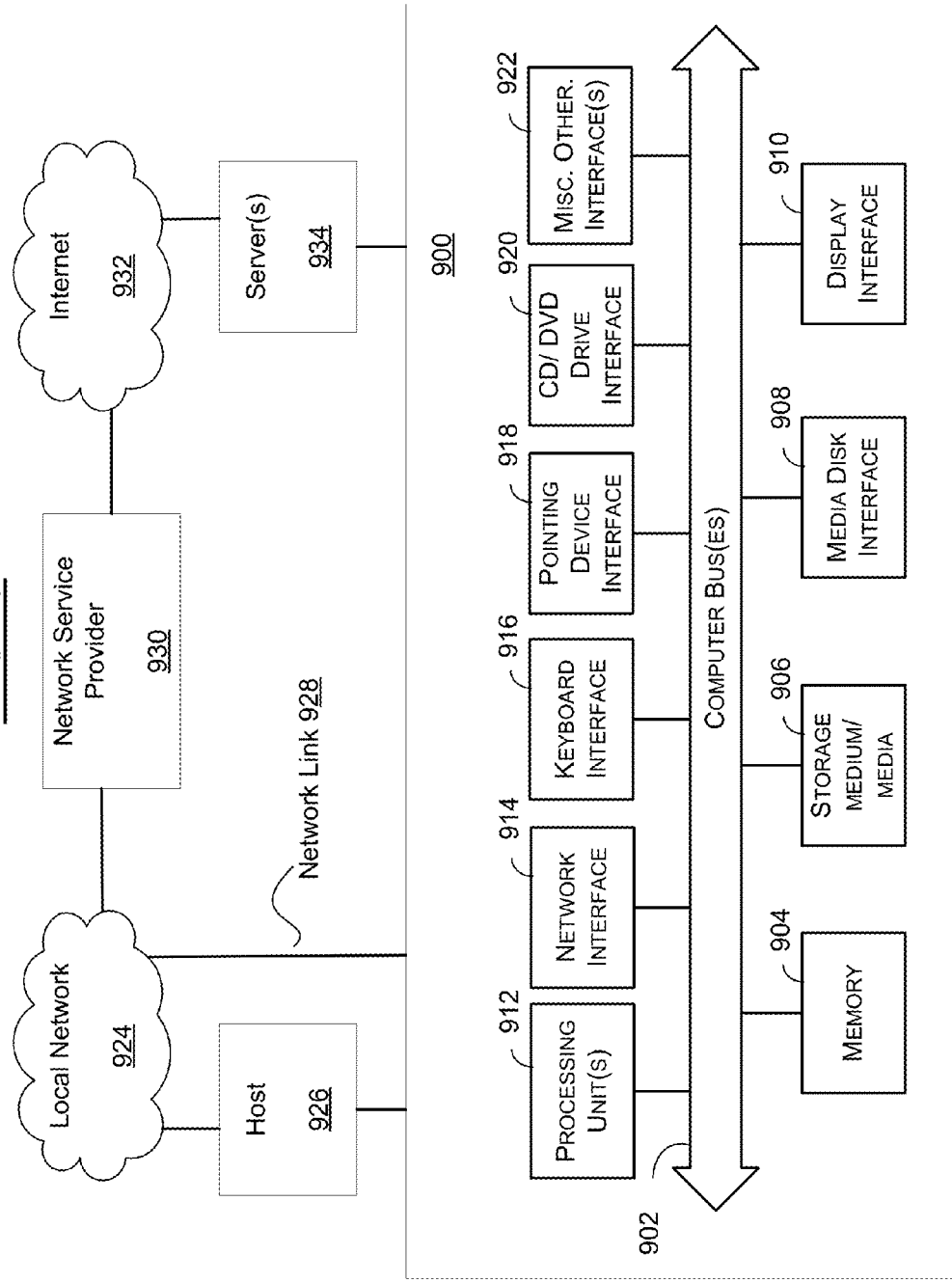
FIG. 9 is a block diagram illustrating the architecture of an exemplary hardware device in accordance with one or more embodiments of the present disclosure.

As shown in FIG. 9, internal architecture 900 of a computing device(s), computing system, computing platform, and the like includes one or more processing units, processors, or processing cores, (also referred to herein as CPUs) 912, which interface with at least one computer bus 902. Also interfacing with computer bus 902 are computer-readable medium, or media, 906, network interface 914, memory 904, e.g., random access memory (RAM), run-time transient memory, read only memory (ROM), media disk interface 908 and/or media disk drive interface 920 as an interface for a drive that can read and/or write to media including removable media such as floppy, CD-ROM, DVD, media, display interface 910 as interface for a monitor or other display device, keyboard interface 916 as interface for a keyboard, pointing device interface 918 as an interface for a mouse or other pointing device, and miscellaneous other interfaces 922 not shown individually, such as parallel and serial port interfaces and a universal serial bus (USB) interface.

Memory 904 interfaces with computer bus 902 so as to provide information stored in memory 904 to CPU 912 during execution of software programs such as an operating system, application programs, device drivers, and software modules that comprise program code, and/or computer executable process steps, incorporating functionality described herein, e.g., one or more of process flows described herein. CPU 912 first loads computer executable process steps from storage, e.g., memory 904, computer readable storage medium/media 906, removable media drive, and/or other storage device. CPU 912 can then execute the stored process steps in order to execute the loaded computer-executable process steps. Stored data, e.g., data stored by a storage device, can be accessed by CPU 912 during the execution of computer-executable process steps.

Persistent storage, e.g., medium/media 906, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 928 typically provides information communication using transmission media through one or more networks to other devices that use or process the information. For example, network link 928 may provide a connection through local network 924 to a host computer 926 or to equipment operated by a Network or Internet Service Provider (ISP) 830. ISP equipment in turn provides data communication services through the public, worldwide packet-switching communication network of networks now commonly referred to as the Internet 932.

A computer called a server host 934 connected to the Internet 932 hosts a process that provides a service in response to information received over the Internet 932. For example, server host 934 hosts a process that provides information representing message data for presentation at display 910. It is contemplated that the components of system 900 can be deployed in various configurations within other computer systems, e.g., host and server.

At least some embodiments of the present disclosure are related to the use of computer system 900 for implementing some or all of the techniques described herein. According to one embodiment, those techniques are performed by computer system 900 in response to processing unit 912 executing one or more sequences of one or more processor instructions contained in memory 904. Such instructions, also called computer instructions, software and program code, may be read into memory 904 from another computer-readable medium 906 such as storage device or network link. Execution of the sequences of instructions contained in memory 904 causes processing unit 912 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 900. Computer system 900 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 902 as it is received, or may be stored in memory 904 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives messages provided by the message or service provider over the Internet in a browser session, or can refer to an automated software application which receives the messages and stores or processes the messages.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   receiving, at a computing device associated with a messaging platform, a message addressed to a second user from a first user, said message comprising a masking identifier representing locked message content set by said first user, said locked message content being inaccessible by said second user without providing a password associated with the masking identifier;
   communicating, via the computing device, said message to a mailbox of said second user that is associated with said messaging platform;
   receiving, at the computing device, a request from said second user to view said locked message content, said request comprising an input from said first user related to said masking identifier;
   determining, via the computing device, that said second user is able to access said locked message content, said determination comprising comparing said input to said password and determining that said input matches said password;

retrieving, via the computing device, said locked message content from a database, said retrieval comprising searching said database for said locked message content based on said masking identifier; and communicating, via the computing device, said locked message content to said mailbox of said second user for display within said message, communication facilitating display of said locked message content in place of said masking identifier.

2. The method of claim 1, further comprising:
determining that said input provided by said second user does not match said password; and denying said request from said second user based on said determination.

3. A method comprising:
receiving, at a computing device, a message in a mailbox of a first user from a second user, said message comprising message content;
receiving, at the computing device, a request to lock a selected portion of said message content, said request comprising received input from said first user that identifies said selected portion;
receiving, via the computing device, a masking identifier to apply to said message in association with said selected portion based on said request, said receiving the masking identifier further comprising receiving a password to associate with said masking identifier that is required to unlock said selected portion;
modifying, via the computing device, said message based on said masking identifier within said mailbox, said modification comprising replacing the selected portion with said masking identifier, said replacing comprising extracting said selected portion from the message such that it is no longer accessible within said message and displaying said masking identifier in a position previously held by the selected portion; and
storing, via the computing device, relationship information associated with said masking identifier and said selected portion in a database, wherein said selected portion can be retrieved from said database based on said masking identifier.

4. The method of claim 3, further comprising:
receiving a second request from said first user to access said locked selected portion, said second request comprising second input associated with said displayed masking identifier;
comparing said second input to said password;
retrieving said selected portion from said database when said comparison results in a determination that said second input matches said password; and
displaying, within said mailbox, said message, said display of said message comprises replacing said masking identifier with said selected portion of content.

5. The method of claim 3, wherein said selected portion of content is unsearchable within said mailbox when said masking identifier is applied to said message.

6. The method of claim 3, wherein said replacing said selected portion with said masking identifier further comprises encrypting the selected portion of said message.

7. A non-transitory computer-readable storage medium tangibly encoded with computer-executable instruction, that when executed by a computing device, perform a method comprising:
receiving a message in a mailbox of a first user from a second user, said message comprising message content;

receiving a request to lock a selected portion of said message content, said request comprising received input from said first user that identifies said selected portion;

receiving a masking identifier to apply to said message in association with said selected portion based on said request, said receiving the masking identifier further comprising receiving a password to associate with said masking identifier that is required to unlock said selected portion;

modifying said message based on said masking identifier within said mailbox, said modification comprising replacing the selected portion with said masking identifier, said replacing comprising extracting said selected portion from the message such that it is no longer accessible within said message and displaying said masking identifier in a position previously held by the selected portion; and storing relationship information associated with said masking identifier and said selected portion in a database, wherein said selected portion can be retrieved from said database based on said masking identifier.

8. The non-transitory computer-readable storage medium of claim 7, further comprising:
receiving a second request from said first user to access said locked selected portion, said second request comprising second input associated with said displayed masking identifier;
comparing said second input to said password;
retrieving said selected portion from said database when said comparison results in a determination that said second input matches said password; and
displaying, within said mailbox, said message, said display of said message comprises replacing said masking identifier with said selected portion of content.

9. The non-transitory computer-readable storage medium of claim 7, wherein said selected portion of content is unsearchable within said mailbox when said masking identifier is applied to said message.

10. A system comprising:
a processor;
a non-transitory computer-readable storage medium for tangibly storing thereon program logic for execution by the processor, the program logic comprising:
receiving logic executed by the processor for receiving a message in a mailbox of a first user from a second user, said message comprising message content;
receiving logic executed by the processor for receiving a request to lock a selected portion of said message content, said request comprising received input from said first user that identifies said selected portion;
receiving logic executed by the processor for receiving a masking identifier to apply to said message in association with said selected portion based on said request, said receiving the masking identifier further comprising receiving a password to associate with said masking identifier that is required to unlock said selected portion;
modification logic executed by the processor for modifying said message based on said masking identifier within said mailbox, said modification comprising replacing the selected portion with said masking identifier, said replacing comprising extracting said selected portion from the message such that it is no longer accessible within said message and displaying said masking identifier in a position previously held by the selected portion; and storage logic executed by the processor for storing relationship information associated with said masking identifier and said selected portion in a database, wherein said selected portion can be retrieved from said database based on said masking identifier.

11. The system of claim 10, further comprising:

receiving logic executed by the processor for receiving a second request from said first user to access said locked selected portion, said second request comprising second input associated with said displayed masking identifier;

comparison logic executed by the processor for comparing said second input to said password;

retrieving logic executed by the processor for retrieving said selected portion from said database when said comparison results in a determination that said second input matches said password; and display logic executed by the processor for displaying, within said mailbox, said message, said display of said message comprises replacing said masking identifier with said selected portion of content.

12. The system of claim 10, wherein said selected portion of content is unsearchable within said mailbox when said masking identifier is applied to said message.

* * * * *